(12) United States Patent
Mahendra et al.

(10) Patent No.: US 10,455,023 B2
(45) Date of Patent: Oct. 22, 2019

(54) SYSTEM AND METHOD FOR REMOTELY ACCESSING A COMPUTING DEVICE

(71) Applicant: RELIANCE JIO INFOCOMM LIMITED, Mumbai (IN)

(72) Inventors: Shweta Mahendra, Navi Mumbai (IN); Saurabh Agrawal, Navi Mumbai (IN)

(73) Assignee: RELIANCE JIO INFOCOMM INCORPORATED, Mumbai, Maharashtra (IN)

(*) Notice: Subject to any disclaimer, the term of this patent is extended or adjusted under 35 U.S.C. 154(b) by 16 days.

(21) Appl. No.: 15/686,112

(22) Filed: Aug. 24, 2017

(65) Prior Publication Data

US 2018/0063251 A1 Mar. 1, 2018

(30) Foreign Application Priority Data

Aug. 26, 2016 (IN) .............................. 201621029084

(51) Int. Cl.
| | |
|---|---|
| *H04L 29/08* | (2006.01) |
| *H04L 12/26* | (2006.01) |
| *G06F 13/38* | (2006.01) |
| *H04L 29/06* | (2006.01) |
| *H04W 12/06* | (2009.01) |

(52) U.S. Cl.
CPC .......... *H04L 67/125* (2013.01); *G06F 13/385* (2013.01); *H04L 43/08* (2013.01); *H04L 43/0817* (2013.01); *H04L 63/0876* (2013.01); *H04L 63/0884* (2013.01); *H04L 63/10* (2013.01); *H04W 12/06* (2013.01); *G06F 2213/0042* (2013.01); *G06F 2213/3812* (2013.01)

(58) Field of Classification Search
CPC ....................................................... H04L 67/125
See application file for complete search history.

(56) References Cited

U.S. PATENT DOCUMENTS

| | | | | |
|---|---|---|---|---|
| 2003/0204601 | A1* | 10/2003 | Takano ................... | H04L 29/06 709/227 |
| 2010/0321395 | A1* | 12/2010 | Maciesowicz ............ | G06F 3/14 345/502 |
| 2016/0196205 | A1* | 7/2016 | Buszynski .......... | G06F 11/3696 717/125 |
| 2016/0226713 | A1* | 8/2016 | Dellinger ................ | H04L 41/12 |

* cited by examiner

*Primary Examiner* — Nicholas P Celani
(74) *Attorney, Agent, or Firm* — Ladas & Parry, LLP

(57) ABSTRACT

Embodiments of the present disclosure relate to remotely accessing at least one computing device [e.g. 102A, 102B, 102C] by an operating device [104]. In a preferred embodiment, a method comprises steps of establishing a wireless connection with an operating device [104] and the at least one computing device [e.g. 102A, 102B, 102C] by a network entity [202]; receiving an access request from the operating device [104] for remotely accessing the at least one computing device [e.g. 102A, 102B, 102C]. Subsequently, the network entity [202] grants an access to the operating device [104] for remotely accessing the at least one computing device [e.g. 102A, 102B, 102C] pursuant to the accomplishment of the reconfiguration/prerequisites such as obtaining a port detail.

9 Claims, 4 Drawing Sheets

SYSTEM AND METHOD FOR REMOTELY ACCESSING A COMPUTING DEVICE

CROSS REFERENCE TO RELATED APPLICATION

This application claims the benefit of and priority to Indian Patent Application No: 201621029084 filed on Aug. 26, 2016, the disclosure of which is hereby incorporated herein by reference in its entirety.

TECHNICAL FIELD

Embodiments of the present disclosure generally relate to communication systems. More particularly, embodiments of the present disclosure is directed to remote monitoring and controlling of a computing device.

BACKGROUND OF THE INVENTION

In current scenario of advancement in wireless technology such as GMS, EDGE, HSPA, LTE, a plurality of communication and content services such as voice, video, data, advertisement, content, messaging, broadcasts, etc. are provided to the users. Further, there exist several such networks, for instance, a UMTS network, successor to GSM technologies, currently supports not only various air interface standards such as Wideband-Code Division Multiple Access (W-CDMA), Time Division-Code Division Multiple Access (TD-CDMA), and Time Division-Synchronous Code Division Multiple Access (TD-SCDMA) but also various enhanced 3G data communications protocols, such as High Speed Packet Access (HSPA) for providing higher data transfer speeds. However, considering various limitations possessed by the UMTS network, an Evolved Universal Terrestrial Radio Access (E-UTRA), being a radio access network standard, is considered to be a replacement of the UMTS and HSDPA/HSUPA technologies as specified in the 3GPP releases 5 and beyond, since LTETs E-UTRA is an entirely new air interface system with advanced features including higher data rates and lower latency.

Additionally, these wireless networks usually have multiple access networks that are configured to support communications for multiple users by sharing the available network resources. In particular, these wireless networks enable a plurality of applications (including, but not limiting to, contact management application, calendar application, messaging applications, image and/or video modification and viewing applications, gaming applications, navigational applications, office applications, business applications, educational applications, health and fitness applications, medical applications, financial applications and social networking applications) embedded in the computing devices to be remotely monitored and tested through various testing devices operating on different platforms, set up at different geographic locations. The existing technologies of remotely testing and controlling the computing devices are inefficient due to certain limitations, one of which is testing and monitoring of the mobile/native applications in various geographical locations under different network conditions. Therefore, users are unable to test the computing devices, through testing devices, in an event the testing devices are at static location while users/testers are located at distributed locations, since the testing devices should be physically connected to the local machine/cloud server through a USB port.

Further, there exist several known solutions to remotely monitor and control the computing devices. In one of the solutions for remotely monitoring and controlling the computing devices, mobile emulators are used to test and debug the mobile/native applications and monitor the same. However, the known solutions of mobile emulators do not reflect specific hardware and software features required for each computing device to be tested and fail to provide specific information relating to brightness and different resolutions. Another limitation of the mobile emulators is that the network based operation cannot be performed on the computing devices both locally and remotely and do not provide the actual results.

Accordingly, in order to overcome the aforementioned problems inherent in the existing solutions for remotely monitoring and controlling the geographically distributed computing devices, there exists a need of an efficient mechanism to remotely monitor the computing devices directly from a centralized location without physically connecting the testing devices with the computing devices.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a system for remotely accessing at least one computing device, the system comprising: a network entity configured to establish a connection with an operating device and the at least one computing device through a wireless network, wherein each of the at least one computing device has an IP address; the at least one computing device configured to authenticate the operating device; and the operating device configured to: transmit an access request to the network entity for remotely accessing the at least one computing device, wherein the access request comprises a port detail and the IP address, obtain the port detail by physically connecting with the at least one computing device, and remotely access the at least one computing device.

Further, the embodiments of the present disclosure encompass a method for remotely accessing at least one computing device, the method being performed by a network entity, the method comprising: establishing a connection with an operating device and the at least one computing device through a wireless network, wherein each of the at least one computing device has an IP address; receiving an access request from the operating device for remotely accessing the at least one computing device, wherein the access request comprises a port detail and the IP address, and the port detail is obtained by the operating device using steps of: physically connecting the operating device with the at least one computing device, and authenticating the operating device by the at least one computing device; and granting an access to the operating device for remotely accessing the at least one computing device.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
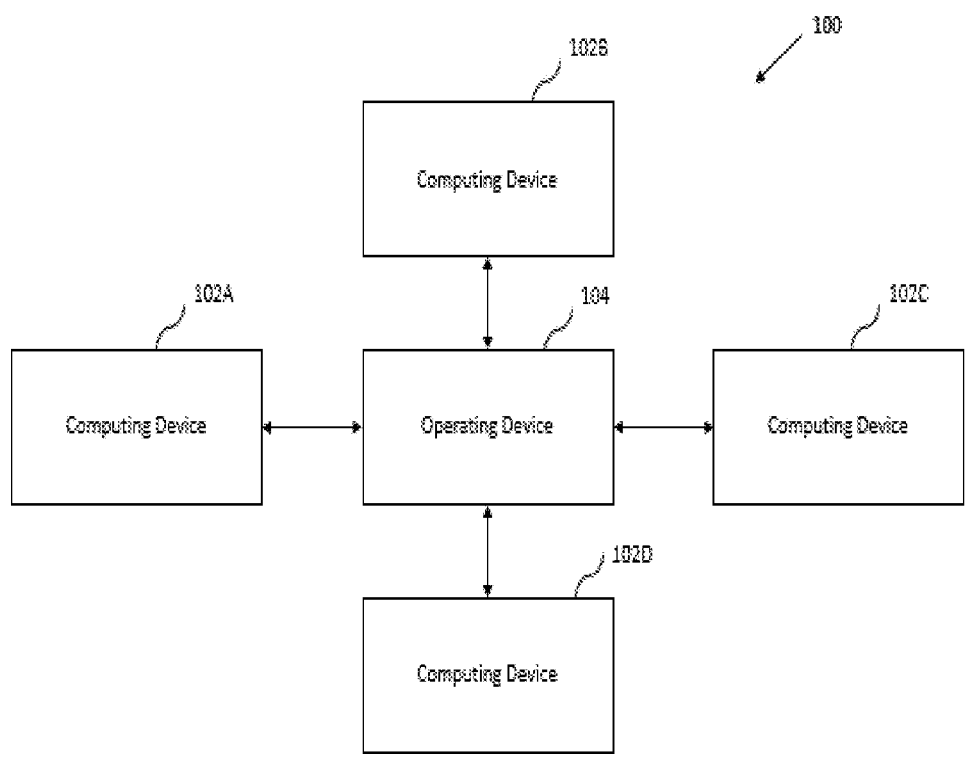
FIG. 1 illustrates a network architecture [100] depicting setting a reconfiguration for remote connection between at least one computing device [for e.g. 102A, 102B, 102C] and an operating device [104], in accordance with one embodiment of the present disclosure.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to a mechanism for remotely accessing a computing device. As a prerequisite/reconfiguration for enabling a remote connection between the computing device and an operating device, the operating device is physically connected with the computing device. Additionally, another reconfiguration/prerequisite may require installation of a plurality of softwares such as Java, Visual Studio Code, Filezilla, JSON, etc. in the operating device. Further, if the computing device successfully authenticates the operating device, the operating device is configured to transmit an access request to the network entity for remotely accessing the at least one computing device, wherein the access request comprises a port detail and the IP address. Furthermore, the operating device is configured to obtain the port detail by physically connecting with the at least one computing device to subsequently access the at least one computing device remotely.

In a preferred embodiment, a port detail and an IP address of at least one computing device is required prior to granting an access to the operating device, i.e. the reconfiguration/ prerequisite required comprises obtaining the port detail and the IP address of the at least one computing device. The process of obtaining the port detail and the IP address comprises physically connecting the operating device and the at least one computing device. As illustrated in FIG. 1, the operating device [104] and the at least one computing device [for e.g. 102A, 102B, 102C] are physically connected through a USB. Subsequent to the connection, the operating device [104] is authenticated, wherein the authentication process is a one-time process and is done using a combination of the IP address and the port number with the operating device [104]. Further, a plurality of backend softwares may be required to be installed in the operating device [104] to enable the operating device [104] to access the at least one computing device and register the same in the operating device, wherein the backend softwares include, but not limited to, Java Runtime Environment (JRE), ADB, Android SDK and Apache Server. Furthermore, the operating device [104] may be required to be configured with a screen simulator to enable the user to view an exact and accurate screen of the at least one computing device [for e.g. 102A, 102B, 102C] in an event the at least one computing device [for e.g. 102A, 102B, 102C] is in a remote location. The enablement and accomplishment of reconfiguration/prerequisites enables the operating device [104] remotely access to the at least one computing device [for e.g. 102A, 102B, 102C].

The at least one computing device [for e.g. 102A, 102B, 102C] as used herein may include, but not limited to, a mobile phone, a smart phone, a laptop, a tablet, a computer, a desktop and any such device obvious to a person skilled in the art. Further, the at least one computing device may comprise an input means such as a keyboard, an operating system, a memory unit, a display interface, etc. Furthermore, the at least one computing device [for e.g. 102A, 102B, 102C] may be a cellular connectivity device supporting 2G, 3G, 4G, and mobile broadband Internet connections with an advanced mobile operating system, wherein the at least one computing device [for e.g. 102A, 102B, 102C] may be geographically distributed in a network.

The operating device [104] as used herein may include, but not limited to, a mobile phone, a smart phone, a laptop, a tablet, a computer, a desktop and any such device obvious to a person skilled in the art. Further, the operating device [104] may comprise an input means such as a keyboard, an operating system, a memory unit, a display interface, etc. Furthermore the operating device [104] may support 2G, 3G or 4G mobile broadband Internet connections with an advanced mobile operating system.

Figure 2:
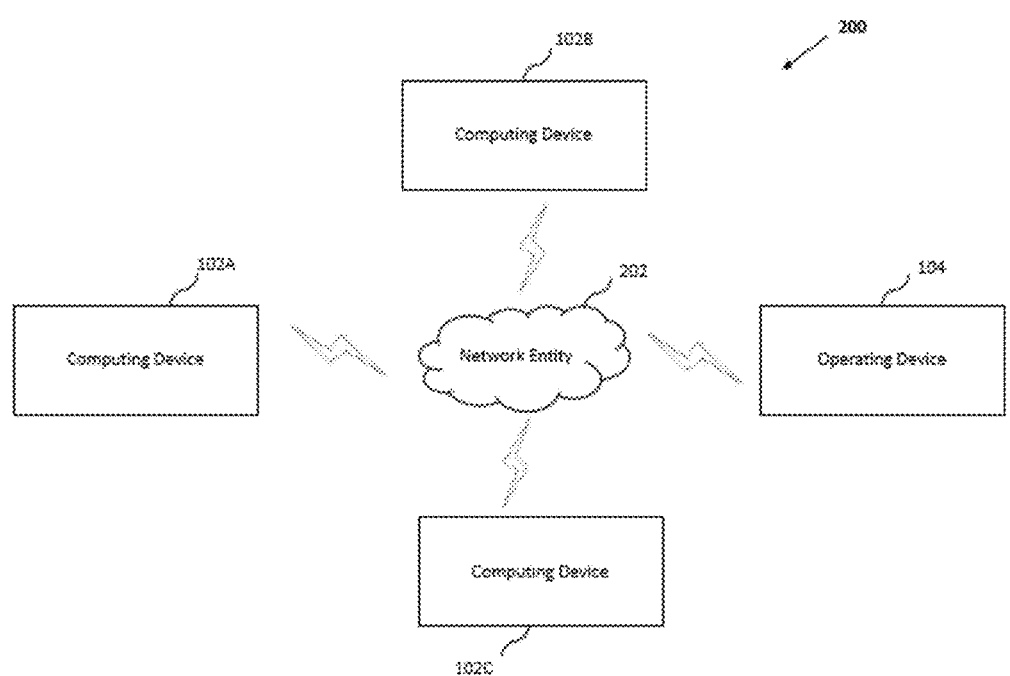
FIG. 2 illustrate a system architecture of a communication network [100] for remotely accessing at least one computing device [for e.g. 102A, 102B, 102C] through a network entity [202], in accordance with one embodiment of the present disclosure.

FIG. 2 illustrate an exemplary embodiment of the present disclosure which encompasses a system architecture for remotely accessing at least one computing device [for e.g. 102A, 102B, 102C] through a network entity, the system [200] comprising a network device, an operating device [104] and at least one computing device [for e.g. 102A, 102B, 102C].

After the accomplishments of the reconfiguration/prerequisites, the network entity [202] may be configured to establish a connection with the operating device [104] and the at least one computing device [for e.g. 102A, 102B, 102C] through the wireless network, wherein each of the at least one computing device [e.g. 102A, 102B, 102C] has the IP address. This wireless connection enhances testing and monitoring of mobile/native applications embedded in the at least one computing device [for e.g. 102A, 102B, 102C] and any network parameter without physically connecting or accessing to the at least one computing device for [e.g.

102A, 102B, 102C]. Further, the network entity [202] may be configured to receive an access request from the operating device [104], wherein the access request comprises the port detail and the IP address obtained by the operating device [104] by the reconfiguration procedures. Each of the port detail corresponds to the at least one computing device [e.g. 102A, 102B, 102C].

Further, on receiving the access request from the operating device [104], the network entity [202] may be configured to grant the access to the operating device [104], for remotely accessing the at least one computing device [e.g. 102A, 102B, 102C]. The remote accessing of the at least one computing device [for e.g. 102A, 102B, 102C] as used herein may include, but not limited to, monitoring, testing and debugging of the at least one computing device [e.g. 102A, 102B, 102C]. In an instance of network health monitoring of the at least one computing device [e.g. 102A, 102B, 102C], a user may run a health check on the at least one computing device [e.g. 102A, 102B, 102C] to monitor a plurality of network parameters such as SINR, RSRP, Cell ID, RSRQ of the network and Upload/Download data rate, Jitter, latency available to the user. In yet another instance, the user may monitor parameters such as quality of audio/video content in mobile applications at the user's end, streaming bit rate and downloading time of audio/video content, application response time, application error codes etc. In another instance, the user may verify actual behavior of the at least one computing device [e.g. 102A, 102B, 102C], wherein the actual behavior of the at least one computing device [e.g. 102A, 102B, 102C] may include parameters such as RAM usage, CPU consumption, battery consumption, memory usage, services running in background/foreground mode, device debugging, etc. Also, various tool licenses may be utilized efficiently by facilitating easy sharing of operating devices, thereby allowing truly distributed testing of the at least one computing device [e.g. 102A, 102B, 102C] spread geographically. Further, the remote accessing of the at least one computing device [e.g. 102A, 102B, 102C] may include monitoring a plurality of mobile/native applications embedded in the at least one computing device [e.g. 102A, 102B, 102C], wherein the mobile/native applications include, but not limit to, a contact management application, a calendar application, a messaging application, an image and/or video modification and an viewing application, a gaming application, a navigational application, an office application, a business applications, an educational application, a health and fitness application, a medical application, a financial applications and a social networking application.

Figure 3:
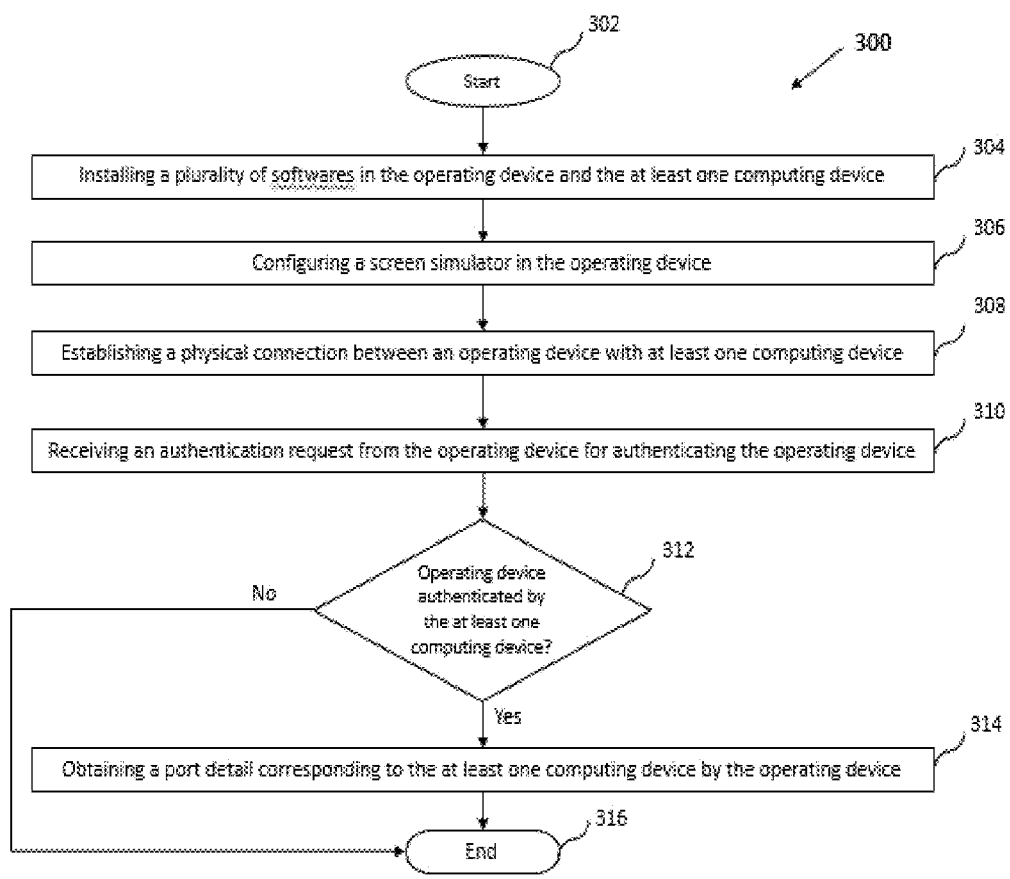
FIG. 3 illustrates an exemplary method flow diagram [300] comprising the reconfiguration procedural steps performed prior to grant of remotely access of at least one computing device [for e.g. 102A, 102B, 102C] through a network entity [202], in accordance with one embodiment of the present disclosure.

As illustrated in FIG. 3, the present disclosure encompasses an exemplary method [300] illustrating reconfiguration procedural steps performed prior to grant of remotely access of at least one computing device [for e.g. 102A, 102B, 102C] through a network entity [202], in accordance with one embodiment of the present disclosure. The method [300] step may initiate at step 302 where the reconfiguration procedural steps are performed for obtaining the port detail and the IP address of the at least one computing device [for e.g. 102A, 102B, 102C] and subsequently enabling remote access of the at least one computing device [e.g. 102A, 102B, 102C].

At step 304, a plurality of softwares such as Java, Visual Studio Code, Filezilla, JSON, may be installed in the operating device [104] by the user. Further, a plurality of backend softwares may be required to be installed by the user in the operating device [104] to enable the operating device [104] to access the at least one computing device [for e.g. 102A, 102B, 102C] and register the same in the operating device [104], wherein the backend softwares include, but not limited to, Java Runtime Environment (JRE), ADB, Android SDK and Apache Server.

At step 306, the operating device [104] may be required to configure with a screen simulator to enable the user to view an exact and accurate screen of the at least one computing device [for e.g. 102A, 102B, 102C] in an event the at least one computing device [for e.g. 102A, 102B, 102C] is in a remote location.

At step 308, the user may establish the physical connection between the operating device [104] the at least one computing device [e.g. 102A, 102B, 102C] through the USB. The physical connection between the operating device [104] the at least one computing device [e.g. 102A, 102B, 102C] is required only one time to remove the dependency of USB ports available in any computing device at later stage.

At steps 310 and 312, the user receives an authentication request at the at least one computing device [e.g. 102A, 102B, 102C] from the operating device [104]. The authentication process is a one-time process and is done using a combination of the IP address and the port number with the operating device [104]. In an exemplary embodiment, the authentication process includes, but not limited to, configuration of Device Authorization System and Port Forwarding system in the operating device [104]. For instance, a command such as 'adb <space> devices' may be entered by the user onto a command window of the operating device [104]. In an event the operating device [104] is not authenticated to access the at least one computing device [e.g. 102A, 102B, 102C], a pop-up/notification indicating 'unauthorized' may be displayed on the screen of the at least one of the operating device [104] and the at least one computing device [e.g. 102A, 102B, 102C], the method [300] may terminate at the step 314. Alternatively, the method [300] may lead to step 310 when the operating device [104] is authenticated to access the at least one computing device [e.g. 102A, 102B, 102C].

At step 314 and after accomplishment of step 312, the port detail is obtained by the operating device [104]. In an exemplary embodiment, a command such as 'adb <space> tcpip <space> xxxx' may be entered by the user onto the command window of the operating device [104] for entering the port detail, wherein the port length is of 4 digit. The method [300] further terminates at step 316 with accomplishments of the reconfiguration/prerequisites.

Figure 4:
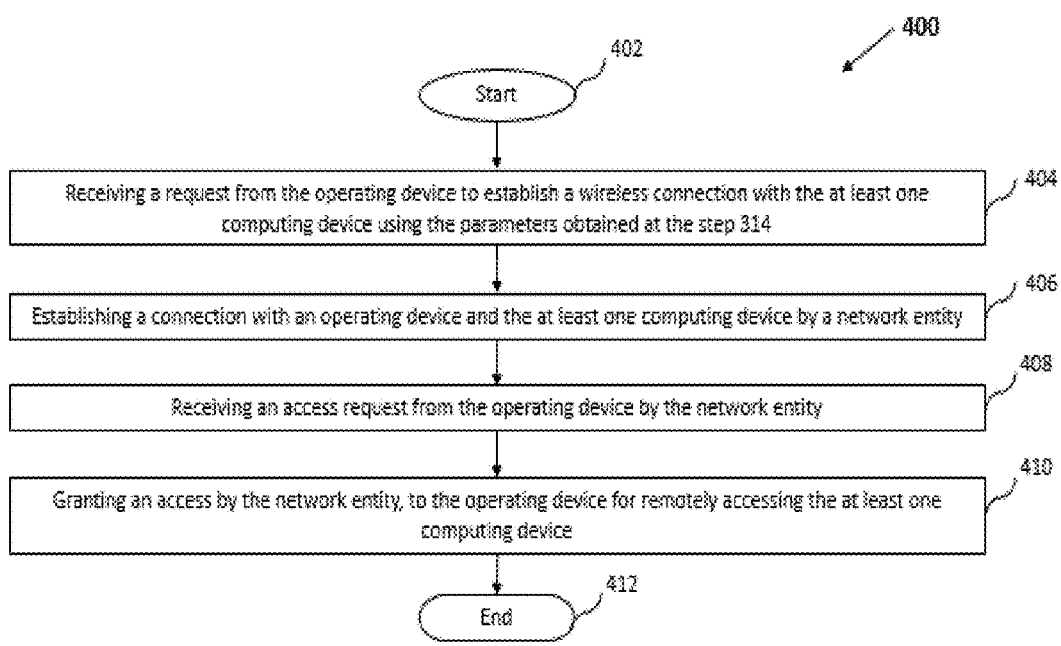
FIG. 4 illustrates an exemplary method flow diagram [400] comprising the method steps being performed for remotely accessing at least one computing device through a network entity, in accordance with an embodiment of the present disclosure.

FIG. 4 illustrates an exemplary method flow diagram [400] comprising the method steps being performed for remotely accessing at least one computing device through a network entity, in accordance with an embodiment of the present disclosure. The method [400] step may initiate at step 402 after the accomplishments of the reconfiguration/prerequisites.

At step 404 and after the accomplishment of the step 314, the network entity [202] may be configured to receive a request from the operating device [104] to establish the wireless connection with the at least one computing device [e.g. 102A, 102B, 102C] using the parameters obtained at the step 314.

At step 406, the network entity [202] may be configured to establish a connection with the operating device [104] and the at least one computing device [for e.g. 102A, 102B, 102C] through the wireless network, wherein each of the at least one computing device [e.g. 102A, 102B, 102C] has the IP address.

At step 408, the network entity [202] may be further configured to receive the access request from the operating device [104], wherein the access request comprises the port detail and the IP address obtained by the operating device [104] by the reconfiguration/prerequisites procedures. Each of the port detail corresponds to the at least one computing device [e.g. 102A, 102B, 102C].

At step 410, the network entity [202] may be configured to grant the access to the operating device [104], for remotely accessing the at least one computing device [e.g. 102A, 102B, 102C], wherein the remote accessing of the at least one computing device [e.g. 102A, 102B, 102C] may include, but not limited to, monitoring, testing and debugging of the at least one computing device. The method terminates at step 412.

Therefore, the present invention encompasses a system and methods for remotely accessing the at least one computing device [e.g. 102A, 102B, 102C] by the operating device [104] pursuant to obtaining port details and authentication of the operating device [104]. The present invention further encompasses manually entering of the IP address and port detail to access and control the at least one computing device [e.g. 102A, 102B, 102C], wherein a user interface of the operating device may be configured to simulate the screen of the at least one computing device [e.g. 102A, 102B, 102C], thereby allowing the user to view and perform various control actions on the interface.

Though a limited number of the computing device [e.g. 102A, 102B, 102C], the operating device [104], the network entity [202] and the components/sub systems therein, have been shown in the figures; however, it will be appreciated by those skilled in the art that the systems [100 and 200] of the present disclosure encompasses any number and varied types of the entities/elements, computing device [e.g. 102A, 102B, 102C], the operating device [104], the network entity [202] and the components/sub systems [100 and 200] therein.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

We claim:

1. A method for remotely accessing a plurality of geographically distributed computing devices for at least one of monitoring, testing and debugging thereof, the method being performed by a network entity the method comprising:
establishing connections between a single operating device and the network entity, and between one of the plurality of geographically distributed computing devices and the network entity through a wireless network, wherein
the operating device is configured with a screen simulator which accesses the one of the plurality of geographically distributed computing devices which enables an operator to view a screen of the one of the plurality of computing devices in a remote location, and
each of the plurality of geographically distributed computing devices has a respective IP address;
receiving, at the network entity, an access request from the operating device for remotely accessing the one of the plurality of geographically distributed computing devices, wherein
the access request comprises a port detail and the respective IP address of the one of the plurality of geographically distributed computing devices, and
the port detail being obtained by the operating device by one-time physical connection between the operating device and the one of the plurality of geographically distributed computing devices to authenticate the operating device by the one of the plurality of geographically distributed computing devices; and
eliminating further use of said physical connection between the operating device and the one of the plurality of geographically distributed computing devices after said authentication; and
granting an access to the operating device for remotely accessing the one of said plurality of geographically distributed computing devices; and
performing at least one of monitoring, testing, and debugging of the one of the plurality of geographically distributed computing devices.

2. The method as claimed in claim 1, further comprising storing the port detail and the respective IP address of the one of the plurality of geographically distributed computing devices.

3. The method as claimed in claim 1, wherein the port detail corresponds to the one of the plurality of geographically distributed computing devices.

4. The method as claimed in claim 1, wherein the operating device is physically connected with the one of the plurality of geographically distributed computing devices through a USB.

5. The method as claimed in claim 1, wherein the operating device is authenticated by the one of the plurality of geographically distributed computing devices using a combination of the respective IP address of the one of the plurality of geographically distributed computing devices and the port number.

6. A system for remotely accessing a plurality of geographically distributed computing devices for at least one of monitoring, testing and debugging thereof, the system comprising:
a network entity configured to establish connections between a single operating device and the network entity, and between one of the plurality of geographically distributed computing devices and the network entity through a wireless network, wherein
the operating device is configured with a screen simulator for accessing the one of the plurality of geographically distributed computing devices, and
each of the plurality of geographically distributed computing devices has a respective IP address;
the plurality of geographically distributed computing devices configured to authenticate the operating device; and the operating device configured to:
transmit an access request to the network entity for remotely accessing the one of the plurality of geographically distributed computing devices, wherein
the access request comprises a port detail and the respective IP address of the one of the plurality of geographically distributed computing devices, and
obtain the port detail by one-time physical connection between the operating device and the one of the plurality of geographically distributed computing devices, and
remotely access said plurality of geographically distributed computing devices,
the network entity eliminates further use of said physical connection between the operating device and the one of the plurality of geographically distributed computing devices after said authentication; and performing at least one of monitoring, testing and debugging of the one of the plurality of geographically distributed computing devices.

7. The system as claimed in claim 6, wherein the network entity is further configured to store the port detail and the respective IP address of the one of the plurality of geographically distributed computing devices.

8. The system as claimed in claim 6, wherein the plurality of geographically distributed computing devices and the operating device comprise at least one of a mobile phone, a smart phone, a laptop, a tablet, a computer and a desktop.

9. The system as claimed in claim 6, wherein the port detail is obtained by the operating device prior to transmitting the access request to the network entity.

* * * * *